July 22, 1969 J. R. RAGEN ET AL 3,457,414

POLARIZED COLOR OPTICAL COMMUNICATION SYSTEM

Filed Aug. 20, 1964 3 Sheets-Sheet 1

INVENTORS.
JACK R. RAGEN
DONALD J. LOUGHRY
BY Alden D. Redfield
Irwin P. Garfinkle
ATTORNEYS.

INVENTORS.
JACK R. RAGEN
DONALD J. LOUGHRY
BY Alden D. Redfield
Irwin P. Garfinkle
ATTORNEYS.

July 22, 1969 J. R. RAGEN ET AL 3,457,414

POLARIZED COLOR OPTICAL COMMUNICATION SYSTEM

Filed Aug. 20, 1964 3 Sheets-Sheet 3

INVENTORS.
JACK R. RAGEN
DONALD J. LOUGHRY
BY Alden D. Redfield
Irwin P. Garfinkle
ATTORNEYS.

3,457,414

POLARIZED COLOR OPTICAL COMMUNICATION SYSTEM

Jack R. Ragen and Donald J. Loughry, Cincinnati, Ohio, assignors to Avco Corporation, Cincinnati, Ohio, a corporation of Delaware Filed Aug. 20, 1964, Ser. No. 390,879
Int. Cl. H04b *9/00*
U.S. Cl. 250—199 7 Claims This invention relates to a system of communication utilizing plane polarized light and, more particularly, to a system of light communication in which plane polarized light is passed through a double refracting medium with dielectric phasing to produce a color and its complement in quadrature polarization, the color and the complement being modulated in a transmitter and demodulated in a receiver.

The invention utilizes the bifringent and phasing characteristics of certain crystalline materials in conjunction with polarization and filtering techniques to provide for transmission and reception of intelligence. Generally, the device functions by shifting the frequency of the carrier, or by shifting the polarization axis of a composite electromagnetic beam, thus providing a means for selecting frequencies and conveying intelligence. The system provides a high degree of secrecy, both in fact of transmission and in information transmitted, and therefore may be especially useful in line-of-sight military communication systems, although it is not so limited.

The fundamental concept utilized in accordance with this invention is the obtaining of a shift in frequency of plane polarized light in a transmitter and detecting such frequency shift in a receiver.

It is an object of this invention to provide a communication system in which plane polarized light is shifted in frequency to produce a color and its complement, to modulate the shifted frequency, and to provide means for detecting the modulations.

Another object of this invention is to provide a communications system in which collimated broadband light is transmitted through a plane polarizing medium and through a double refracting medium with dielectric phasing to produce a color and its complement in quadrature polarization, and effectively to modulate said color and complement as a function of the signal to be transmitted, and a receiver having means for retecting the modulations.

Still another object of this invention is to provide such a communication system in which the selected color and its complement are modulated by angular rotation of its components with respect to an analyzer in the receiver.

Still another object of this invention is to modulate the selected color and its complement by rotation of the plane polarizing medium and the double refracting medium on an axis parallel to the path of transmission.

Another object of this invention is to modulate the selected color and its complement by rotation of the double refracting medium on an axis transverse to the path of transmission whereby the length of the path through the double refracting medium is varied to frequency modulate the selected color and its complement.

Still another object of this invention is to modulate the selected color and its complement by means of a magnetic field along the path of transmission for rotating the color components on an axis parallel to the transmission path.

For additional objects and for a more detailed explanation of this invention, reference should now be made to the following specification and to the accompanying drawings in which:

FIGURE 5 is still another modification of this invention.

Figure 1:
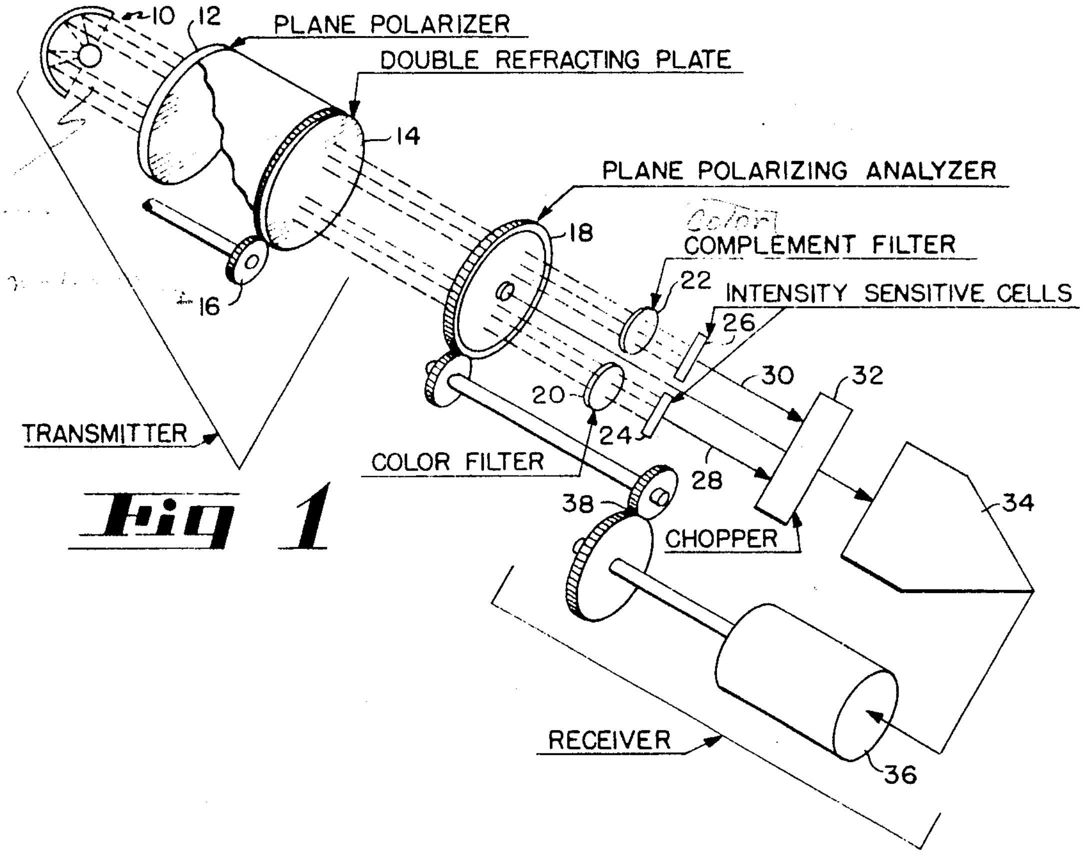
FIGURE 1 illustrates one simplified form of this invention.

Referring first to FIGURE 1, there is shown a collimated light source 10 producing a nonpolarized, broadband (white) source of electromagnetic energy. The light source 10, which provides the energy for the transmission of information, is directed first through a plane polarizer 12 which serves to pass only a single polarization of the light source 10; for example, wave lying in a vertical plane. The plane polarized light waves are then passed through a double refracting plate 14 having dimensions to provide the appropriate phase delay for producing a selected color and the complement of that color. The selected color will be polarized and will be oriented in the same plane as the light emanating from the polarizer 12, but the complement will be oriented at 90° with respect to the selected color. Intelligence for transmission is introduceded by modulating the selected color and complement. In the FIGURE 1 embodiment of this invention, modulation is accomplished by rotating the plane polarizer 12 and the double refracting plate 14 simultaneously by any suitable means such as schematically indicated at 16. Thus in the transmitting device, two plane polarized frequency components are generated with the angle of polarization differing by 90°, and a means for rotating both components while maintaining the initial 90° quadrature is provided.

Demodulation is accomplished in the receiver portion of the system where the angular movement of the transmitter polarizer and refracting plate is determined. This is done by measuring the magnitudes of the two received frequency components by means of a plane polarizing analyzer 18, filters 20 and 22, and intensity sensitive cells 24 and 26.

Figures 3, 4:
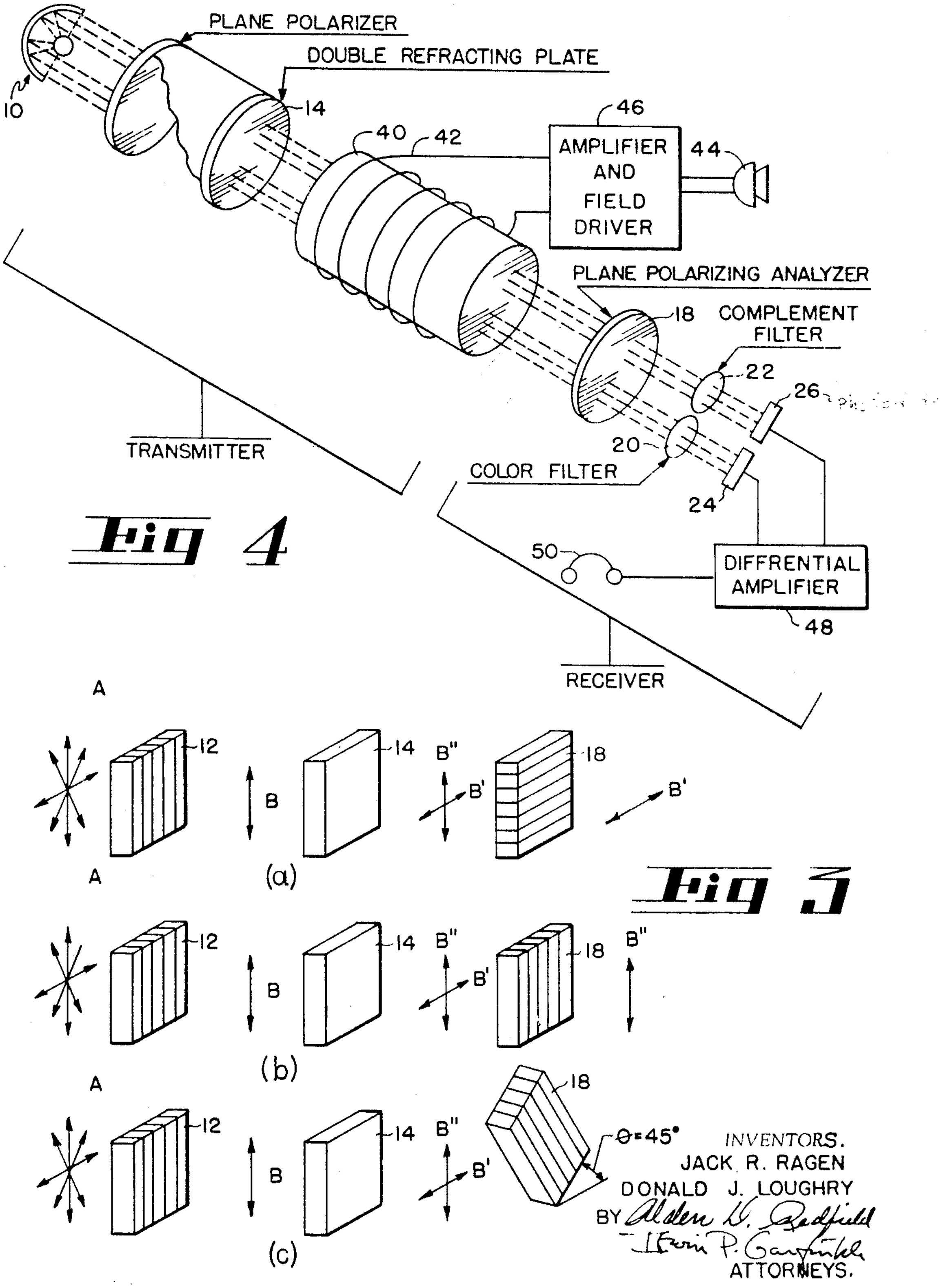
FIGURE 3 is a theoretical explanation of certain aspects of this invention.
FIGURE 4 is a modified communication system in accordance with this invention.
Figure 3:
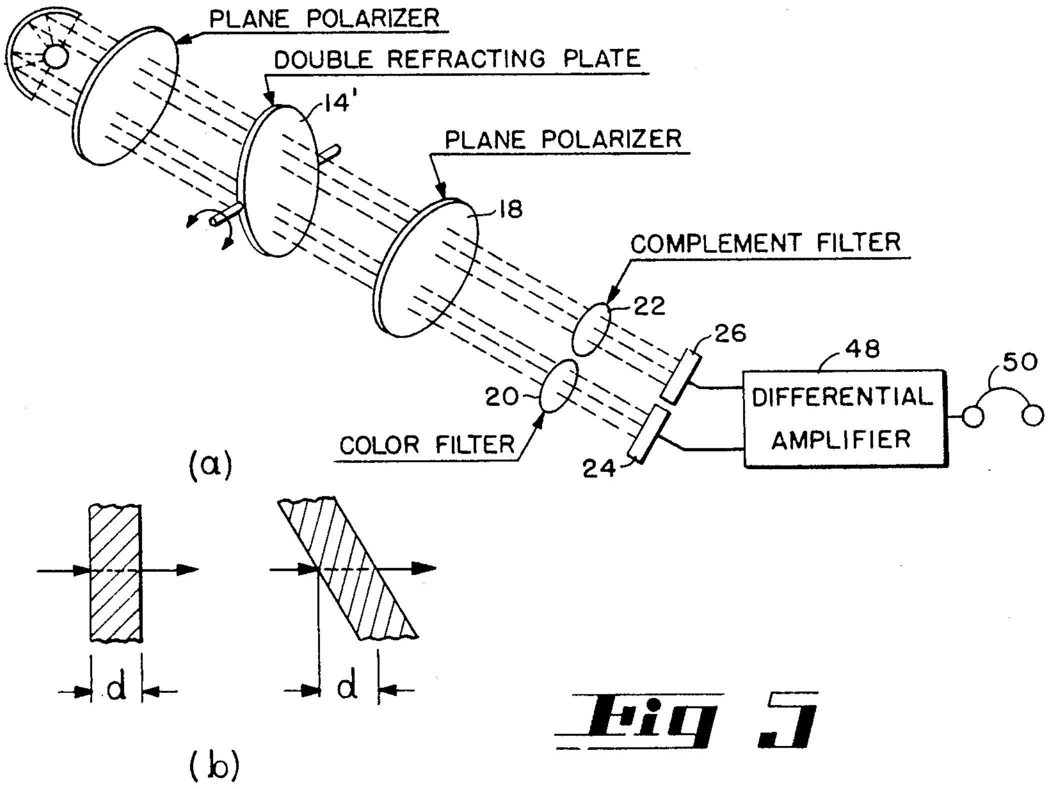

At this point reference should be made to FIGURE 3 in which the plane polarizer 12, the double refracting plate 14, and the analyzer 18 are illustrated in three relationships, FIGURES 3(*a*), 3(*b*), and 3(*c*). The group of vectors A represents the random polarization of the broadband source of light 10 containing many frequencies and having reasonably collimated or parallel rays. The plane polarizer 12 is illustrated with its axis oriented vertically such that it passes only the vertically polarized waves B of vector group A. Thus, at the output side of the polarizer 12 only the vertically polarized energy component of the original vector group appears. This vertical component is a plane polarized wave still containing the same spectrum of frequencies as the original source represented by the vector group A.

The plane polarized wave B is then passed through the bifringent or double refracting plate 14 where the single plane polarized plane wave B is split into two plane waves B′ and B″ with their polarization axes displaced 90° from each other. The waves B′ and B″ are propagated at different velocities through the plate 14 resulting in a phase differential between the two waves at the output of the plate 14. This results in two plane polarized waves vibrating in two mutually orthogonal directions with one wave B′ containing a predominance of energy at one band of frequencies (color) due to phasing, and the other B″ containing the complementary frequencies (color) of the first wave B′. The particular frequencies are dependent upon the phasing, and effectively on the thickness and index of refraction of the particular bifringent material used for the plate 14. The waves B′ and B″ are then applied to the analyzer 18.

In FIGURE 3(*a*) the axis of the analyzer 18 is aligned with the component B', and thus allows the component B' and its associated frequencies to be propagated with very little attenuation. However, since the component B'' is not aligned with the axis of the analyzer 18, it is retarded and not propagated. In FIGURE 3(*b*), however, the analyzer 18 has been rotated 90° such that its polarization axis is now aligned with the component B'', and as such the B'' vector and its associated frequencies are propagated while the B' component is retarded. In FIGURE 3(*c*) the analyzer 18 has been rotated such that its polarizing axis is not aligned with either of the components B' or B'' but is displaced from B' by the angle $\theta$ and from B'' by the angle $90-\theta$. When the angle $\theta$ is 45°, the output from the analyzer 18 is equal to the summation of vectors B' and B'', $B' \sin \theta + B'' \cos \theta$. Where $\theta$ is 45°, the summation of the frequency components of vector B' and the complementary components B'' has the same frequency spectrum as the initial source represented by the vector group A. If the source was white light, that at $\theta=45°$, the output of analyzer 18, as oriented in FIGURE 3(*c*), would be white light. On the other hand, with the orientation illustrated in FIGURE 3(*a*), the component B' would contain a particular band of frequencies while the output B'' with the orientation of FIGURE 3(*b*) would contain its complement.

Referring back to FIGURE 1, the output from the analyzer 18 is passed through the two filters 20 and 22, one passing only the color representing the component B' and the other passing only the component B'', that is, the selected color and its complement. The outputs from the color filters 20 and 22 are applied, respectively, to light intensity cells 24 and 26 where an electrical output having a magnitude proportional to the intensity of the light is generated at lines 28 and 30, respectively.

Figure 2:
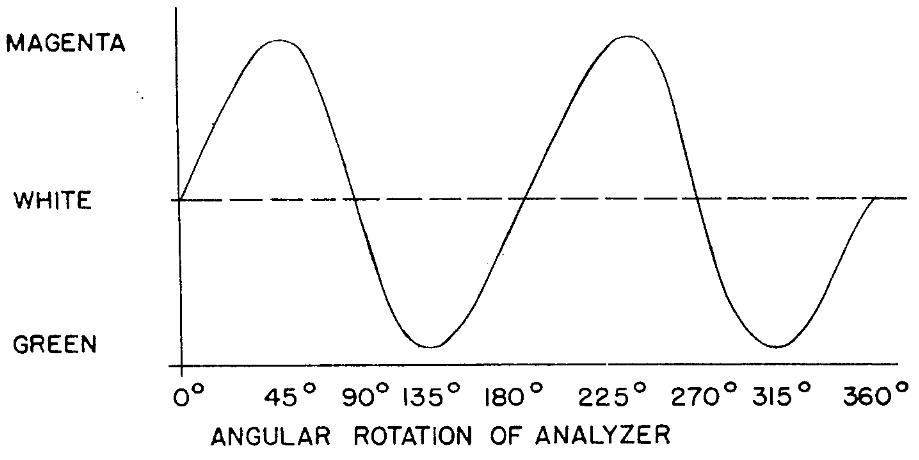
FIGURE 2 is a curve illustrating the operation of the embodiment of FIGURE 1.

If it is assumed that the medium 12 and plate 14 are rotated at a uniform rate, then the output from the analyzer 18 changes sinusoidally from white to a pure color, through white to a complementary color and back to white. (See FIGURE 2 where it is assumed that the color is green and the complement is magenta.) The outputs at lines 28 and 30 are applied to a chopper 32 to produce an output representing the differential of the voltages on lines 28 and 30, and this differential will be sinusoidal passing through zero for white light and positive or negative, depending on the frequency component of the highest intensity at the output of the analyzer 18.

The output from the chopper 32 is applied to an A.C. servo amplifier 34 and to a servo motor 36 which serves to rotate the analyzer 18 through gearing 38, so that the analyzer follows the angular rotation of the transmitter with very small errors. The stable angular position of the analyzer 18 is obtained when its output is white light which is the cross-over between the two color components. Thus, the two color components provide the rotational sense information for the servo follower and provide a reversible null angle seeking device.

FIGURE 4 represents a modification of this invention where the rotation of the polarized components is obtained without mechanical motion for periodic angular changes. This modification includes essentially the same optical system including the source 10, the plane polarizer 12, the double refracting plate 14, and the analyzer 18. However, located at the transmitter and interposed between the double refracting plate 14 and the plane polarizing medium 18 is a light transmitting medium 40 around which a coil 42 is wound. The coil 42 is supplied with and driven by electrical energy from a microphone 44 and an amplifier 46. The arrangement utilizes the Faraday effect, that is, medium 40, which is transparent and isotropic, is placed in a strong magnetic field which causes rotation of the plane of vibration of the polarized light passing through the medium in the direction of the magnetic field. The direction of rotation depends on whether the velocity of the light is parallel or antiparallel to the magnetic field. A Kerr rotator could also be used for the purpose of rotating the plane polarized components passing through the double refracting plate 14.

The detecting section of the receiver is also similar to that of FIGURE 1, utilizing the filters 20 and 22 and intensity sensitive cells 24 and 26. However, the differential output of the intensity detectors 24 and 26 is the demodulated information that was transmitted and is simply amplified in a differential amplifier 48. The output of amplifier 48 may then be applied to earphones 50. It will be understood that combinations of the systems of FIGURES 1 and 4 may be made by transmitting both angular information as well as audio or other information simultaneously as desired. It will be recognized that the system of FIGURE 3 is an effective amplitude modulated system of communication.

A frequency modulation communication system is shown in FIGURE 5. In this case all the components are identical to those shown in FIGURE 4 with the exception of the mounting for the double refracting plate. In this case a plate 14' is used which is rotatable along an axis defined by one of its diameters. As can be seen from FIGURE 5(*b*), as the double refracting plate 14' is rotated through an angle, the effective axial thickness of the plate is altered thus changing the band of frequency (color) contained in one plane of polarization. The resulting plane polarized output beam is therefore frequency modulated. The characteristics of the double refracting plate 14' may be altered by other means than simple rotation; for example, properly driven piezoelectric crystals of bifringent materials (strontium titanate) will produce the same results.

The frequency modulated components of light are directed from the output of the plate 14' to the plane polarizing analyzer 18. Since the plane 14' changes in effective length, as indicated in FIGURE 5(*b*), as it is rotated about one of its diameters, the frequency of the light is changed, and hence its color is changed although the components are nevertheless maintained planer and are vertically and horizontally oriented. The analyzer 18 is oriented at 45° with respect to both components, and the intensity of the outputs of each of the components will vary as the plate 14' is driven. Filters 20 and 22 are selected to pass the frequencies produced by the refracting plate 14' at the extremities of motion. The differences in intensity of the components passing through the filters 20 and 22 are detected in the intensity sensitive cells 24 and 26, the outputs of which are applied to the differential amplifier 48 and to any suitable transducer, such as earphones 50.

It will be noted that the system is normally immune to polarized or unpolarized ambient background illumination, as long as a nominal signal-to-background noise level is maintained, and the detectors are not saturated. The immunity is based on the fact that both system color components are usually present in normal background illumination. Moreover, the intervening information beam of light between the transmitting and receiving devices produces little or no indication to the naked eye, since the two frequency components together contain the full spectrum of the original energy source, here white light.

In a practical system, the invention contemplated use of electromagnetic energy in the 0.1 to 1 micron wavelength region as an information carrier. However, the system may be operated at any wavelength, depending upon system requirements.

It will be apparent to persons skilled in the art that that invention is susceptible to many variations and adaptations. For example, the analyzer 18 could be included either in the receiver portion of the system (as shown) or in the transmitter without departing from the spirit of this invention. Moreover, the light may be in the visible or invisible band of frequencies. For that reason it is intended that this invention be limited only by the appended claims as interpreted in the light of the prior art.

What is claimed is:

1. In a communication system, the combination comprising:

a double refracting plate with dielectric phasing properties, said plate having characteristics to provide a phase shift of plane polarized light to produce a selected color component and the complementary color component of said color in quadrature polarization;

a source of plane polarized light, rays from said source of plane polarized light being transmitted through said plate;

modulating means for simultaneously rotating both said selected color component and said complementary component on an axis parallel to the path of transmission of said rays, said selected color component and said complementary color component in accordance with signal; and demodulating means for demodulating said modulated selected color component and said complementary color component to derive said signal, said demodulating means including a polarization analyzer having a polarizing axis positioned substantially 45° with respect to said selected color component and said complementary color component in the absence of signal.

2. The invention as defined in claim 1 wherein said means for effectively rotating said components includes mechanical means for rotating said source and said plate on an axis parallel to the path of transmission of said rays.

3. The invention as defined in claim 1 wherein said means for effectively rotating said components includes an additional light transmitting medium for said selected color component and said complementary color component; and a magnetic field surrounding said additional medium for rotating said components on an axis parallel to the path of transmission of said rays, said magnetic field being proportional in magnitude to said signal.

4. In a communication system, the combination comprising:

a double refracting plate with dielectric phasing properties, said plate having characteristics to provide a phase shift of plane polarized light to produce a selected color component and the complementary color component of said color in quadrature polarization;

a source of plane polarized light, rays from said source of plane polarized light being transmitted through said plate;

modulating means for simultaneously rotating in accordance with signal both said selected color component and said complementary color component on an axis parallel to the path of transmission of said rays; and demodulating means for demodulating said modulated selected color component and said complementary color component to derive said signal, said demodulating means including a polarization analyzer having a polarising axis positioned substantially 45° with respect to said selected color component and said complementary color component in the absence of signals, first and second light filters, the first of said filters passing only said complementary color component and rejecting said complementary color component, the second of said filters passing only said complementary color components and rejecting said selected components, both of said filters intercepting the light passing through said polarization analyzer, and first and second light sensitive devices, one for intercepting the light passing through said first and second filters, respectively, said light sensitive devices producing an output in accordnace with the intensity of the intercepted light.

5. The invention as defined in claim 4, and means for differentially combining the outputs of said light sensitive devices.

6. The invention as defined in claim 5 wherein said means for effectively rotating said components include mechanical means for rotating said source and said plate on an axis parallel to the path of transmission of said rays.

7. The invention as defined in claim 5 wherein said means for effectively rotating said component includes an additional light transmitting medium for said selected color component and said complementary color component; and a magnetic field surrounding said additional medium for rotating said components on an axis parallel to the path of transmission of said rays, said magnetic field being proportional in magnitude to said signal.

References Cited

UNITED STATES PATENTS

| | | | |
|---|---|---|---|
| 2,837,087 | 6/1958 | Sawyer | 88—65 X |
| 2,933,972 | 4/1960 | Wenking | 88—61 X |
| 3,016,789 | 1/1962 | Keston | 88—65 X |
| 3,214,590 | 10/1965 | Schactman | 250—199 |

FOREIGN PATENTS

| | | |
|---|---|---|
| 132,858 | 9/1919 | Great Britain. |

OTHER REFERENCES

Niblack and Wolf: Polarization Modulation and Demodulation of Light, article in Applied Optics, vol. 3, No. 2, February 1964, pp. 277–279.

RALPH D. BLAKESLEE, Primary Examiner

BENEDICT V. SAFOUREK, Assistant Examiner

UNITED STATES PATENT OFFICE
CERTIFICATE OF CORRECTION

Patent No. 3,457,414 July 22, 1969

Jack R. Ragen et al.

It is certified that error appears in the above identified patent and that said Letters Patent are hereby corrected as shown below:

Column 4, line 36, "plane 14′" should read -- plate 14′ --; line 69, "that" should read -- this --. Column 5, line 15, after "complementary" insert -- color --. Column 6, line 11, after "said" insert -- selected --; line 26, "include" should read -- includes --; line 30, "component" should read -- components --.

Signed and sealed this 28th day of April 1970.

(SEAL)
Attest:

Edward M. Fletcher, Jr.
Attesting Officer

WILLIAM E. SCHUYLER, JR.
Commissioner of Patents